United States Patent [19]
Ao et al.

[11] Patent Number: 4,754,221
[45] Date of Patent: Jun. 28, 1988

[54] POSITION DETECTING APPARATUS FOR DETECTING A SIGNAL MAGNETIC FIELD INDICATIVE OF A DESIRED POSITION

[75] Inventors: Kenichi Ao, Obu; Yoshimi Yoshino, Inuyama, both of Japan

[73] Assignee: Nippondenso Co., Ltd., Kariya, Japan

[21] Appl. No.: 807,023

[22] Filed: Dec. 9, 1985

[30] Foreign Application Priority Data

Dec. 14, 1984 [JP] Japan ................................ 59-264857

[51] Int. Cl.$^4$ ............................................. G01B 7/30
[52] U.S. Cl. .................................... 324/208; 324/252; 338/32 R
[58] Field of Search ............... 324/207, 208, 252, 260, 324/261, 262, 235; 338/32 R

[56] References Cited

U.S. PATENT DOCUMENTS

| 4,319,188 | 3/1982 | Ito et al. ......................... 324/208 X |
| 4,570,118 | 2/1986 | Tomczak et al. ................. 324/208 |
| 4,649,342 | 3/1987 | Nakamura ....................... 324/252 X |

FOREIGN PATENT DOCUMENTS

| 3308352 | 9/1983 | Fed. Rep. of Germany ...... 324/208 |
| 3308404 | 9/1983 | Fed. Rep. of Germany ...... 324/208 |
| 58-16580 | 1/1983 | Japan . |
| 92901 | 6/1983 | Japan ................................ 324/208 |
| 59-18458 | 1/1984 | Japan . |
| 147213 | 8/1984 | Japan ................................ 324/208 |

OTHER PUBLICATIONS

"The Origin of Barkhausen Noise in Small Permalloy Magnetoresistive Sensors", C. Tsang and Decker, 3-1981, J. Appl. Phys., pp. 2465-2467.

Primary Examiner—Reinhard J. Eisenzopf
Assistant Examiner—Warren S. Edmonds
Attorney, Agent, or Firm—Cushman, Darby & Cushman

[57] ABSTRACT

When applying a bias field in the direction of the easy axis of magnetization of a signal field-detecting MR element assembly, a leakage magnetic field of a magnetic recording medium adapted to generate a signal field is applied as the desired bias field without using any exclusive bias field application device. The magnetic recording medium and the thin-film MR element assembly are arranged in a manner that they make a predetermined angle.

7 Claims, 4 Drawing Sheets

POSITION DETECTING APPARATUS FOR DETECTING A SIGNAL MAGNETIC FIELD INDICATIVE OF A DESIRED POSITION

BACKGROUND OF THE INVENTION

The present invention relates to a magnetic signal detecting apparatus employing a ferromagnetic magnetoresistive element (hereinafter referred to as an MR element) and more particularly to a position detecting apparatus adapted to detect a signal magnetic field indicative of a desired position.

The position detecting apparatus employing an MR element is high in detection sensitivity, so that the utilization of its digital magnetic signal as a detection signal is looked for.

FIG. 1 shows a magnetic field characteristic of the MR element. Its resistance value R varies with a variation of a magnetic field H perpendicular to a detection current i (in the transverse or short direction of the MR element), that is, the resistance value R increases gradually with decrease in the magnetic field H and it increases rapidly as the magnetic field H becomes lower than a certain value. This resistance variation (the curve $l_1$) differs between cases where the magnetic field H reverses its direction from positive to negative and where the magnetic field H reverses its direction from negative to positive and there are instances where the distortions B are caused by the hysteresis of the magnetic response due to the anisotropic dispersion or the Barkhausen noise. Also, where such distortion is large, the resistance value fails to increase or it decreases as shown by the broken line $l_2$ in FIG. 1. Also, from the aspect of manufacture there are problems that the post-fabrication characteristics of the elements tend to become nonuniform, that the yield is subjected to fluctuation and so on.

With a view to overcoming the foregoing deficiencies, various methods have been investigated in which a bias field is applied in the longitudinal direction of the MR element so as to prevent any instability of a detection output, etc., (e.g., Japanese Patent Unexamined Publication Nos. 16580/83 and 18458/84).

In this type of apparatus, a signal field generating multipole magnet and the MR element are arranged in such a manner that the axial direction of the former and the patterned surface of the latter are parallel to each other. In the case of this conventional apparatus, as shown by the characteristic b in FIG. 3, the peak value position is shifted by the hysteresis characteristic from each N or S pole position in the direction of the rotation and also a distortion in the resistance variation is caused by noise thus reducing the rate of resistance variation $|\Delta R/R_0|$ to about 2%. Here, $R_0$ the resistance value when the magnetic field H is zero.

SUMMARY OF THE INVENTION

It is an object of the present invention to provide a magnetic position detecting apparatus so designed that a leakage magnetic recording medium field of a position-signal generating magnet is applied as a bias field in the direction of the easy axis of magnetization of an MR element such that instability of a detection output, such as, a hysteresis characteristic is reduced thus reducing any detection output instability such as a hysteresis characteristic to prevent any shift of peak value positions and reducing variations of detection outputs due to any nonuniformity of characteristics and thereby improving the rate of resistance variation.

It is another object of the present invention to provide such a position detecting apparatus of a novel construction in which the application of a bias field to the MR element is accomplished without using any exclusive biasing means such as a biasing magnet.

DESCRIPTION OF THE PREFERRED EMBODIMENTS

Figure 2A:
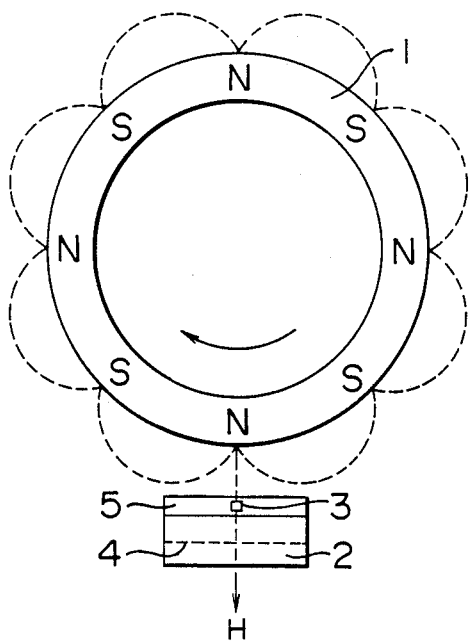
FIGS. 2(a) to 2(c) are respectively a top view, side view and front view of an embodiment of the present invention.
Figure 2B:
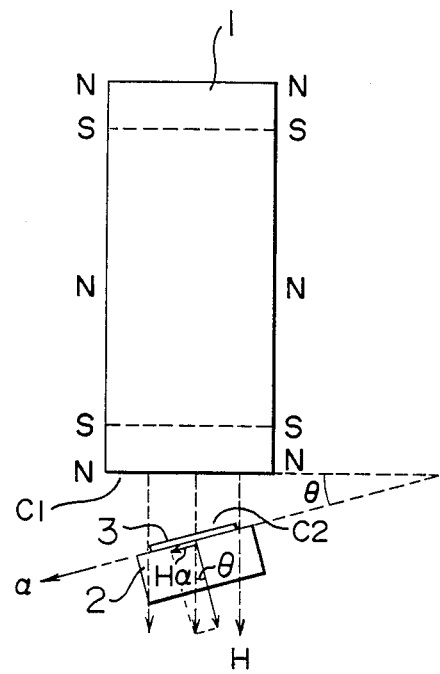
Figure 2C:
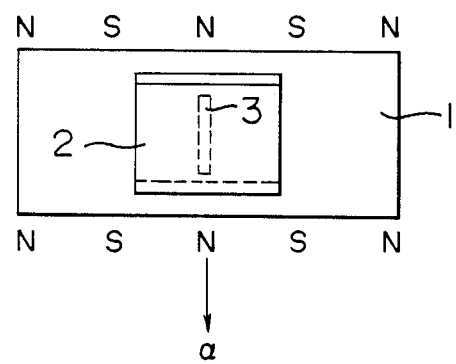

The present invention will now be described with reference to FIGS. 2(a) to 2(c) illustrating an embodiment of the invention. FIG. 2(a) shows its top view, FIG. 2(b) its side view and FIG. 2(c) its front view. An MR element assembly 2 is oppositely arranged on the outer side of a multipole ring magnet 1 magnetized to form magnetic poles on its outer peripheral sides. As will be seen from FIG. 2(b), the MR element assembly 2 and the magnet 1 are arranged in such a manner that the angle $\Theta$ made by the side $C_1$ corresponding to the axial direction of the multipole ring magnet 1 and the patterned surface $C_2$ containing an MR element pattern 3 on the MR element assembly 2, particularly the longitudinal direction $\alpha$ of of the pattern 3, has a predetermined value between 1° and 56°, preferably between 1° and 45°. In this way, instead of mounting a biasing magnet on the back surface of the MR element assembly 2, a bias field is applied in the longitudinal direction of the MR element pattern 3 by any of the N and S poles of the magnet 1. The construction of the MR element assembly 2 includes a predetermined insulating base 4 having thereon a uniaxial anisotropic ferromagnetic thin film of a given shape, particularly formed in a narrow strip pattern and a protective layer 5 formed to enclose the thin film.

With the construction described above, when the intermediary portion between the N and S poles of the magnet 1 is substantially opposite to the patterned surface of the MR element assembly 2, the strength of the magnetic field parallel to the patterned surface of the MR element assembly 2 and perpendicular to the longitudinal direction of the MR element pattern is increased to the maximum and at this time the resistance value of the MR element assembly 2 is reduced to the minimum. On the other hand, when the N pole or the S pole of the magnet 1 is above the patterned surface of the MR element assembly 2, the field strength of the same directions as mentioned previously is reduced to the minimum and the resistance value of the MR element assembly 2 is increased to the maximum. At this time, the field strength H tending to pass through the MR element patterned surface is increased to the maximum so that of the field strength H of the N or S pole the magnetic field component "$H\sin\Theta$" corresponding to the angle $\Theta$ is applied fully as a bias field $H\alpha$ in the longitudinal direction of the MR element pattern 3 or the direction $\alpha$ of its easy axis of magnetization. It has been discovered that this application of a bias field in the direction of the easy axis of magnetization has the effect of eliminating the previously mentioned anisotropic dispersion and Barkhausen noise, improving the hysteresis characteristic of the MR element assembly, preventing any shift of the peak value positions and the occurrence of discontinuous characteristics, improving considerably the rat of resistance variation than previously and preventing any instability of the resistance variation.

Figure 1:
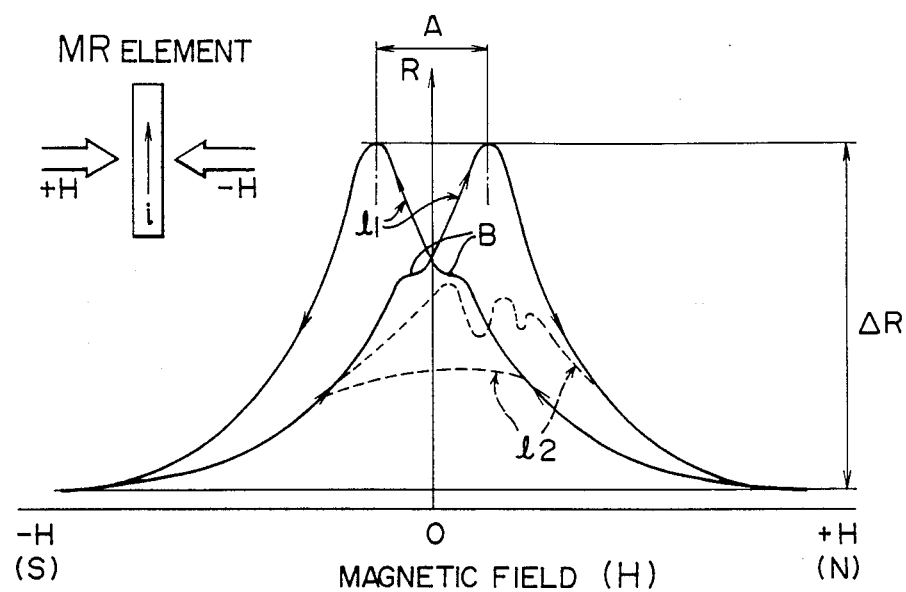
FIG. 1 is a characteristic diagram of an MR element.
Figure 3:
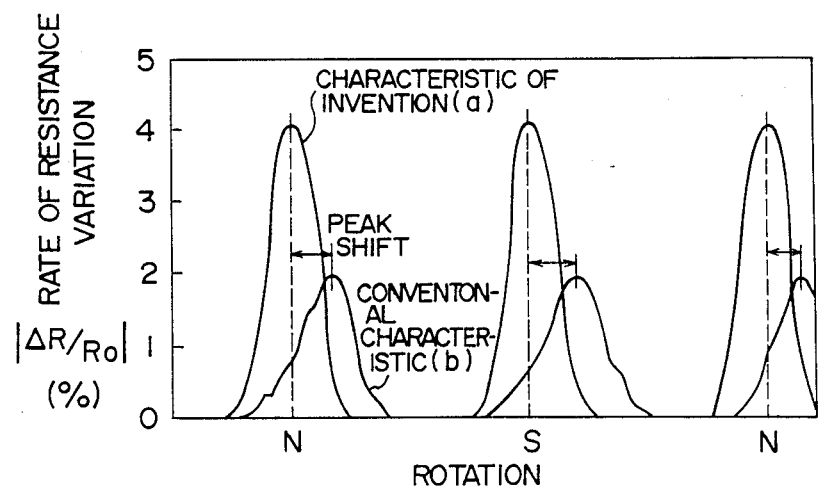
FIGS. 3 and 4 are characteristic diagrams useful for explaining the invention.

Shown in FIG. 3 are the results of experiments showing the relation between the rotational position and the rate of resistance variation ($\Delta R/R_0$) in the case of a conventional apparatus and the present embodiment (in the case $\Theta \approx 40°$) employing MR element assemblies 2 of substantially the same construction. The foregoing will also be seen fully from the Figure.

Figure 4:
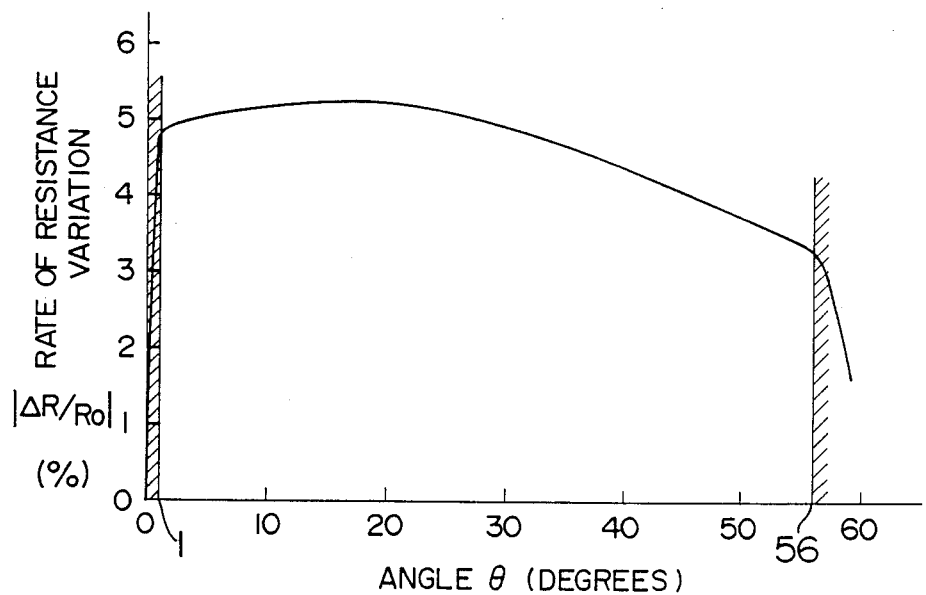

Referring now to FIG. 4, there is illustrated the relation between the angle $\Theta$ formed by the side of the multipole ring magnet 1 and the MR element pattern 3 and the rate of resistance variation. As will be seen from the Figure, if the angle $\Theta$ is less than 1°, the desired axial bias field is not easily obtainable, so that the detection output of the MR element assembly 2 becomes unstable and the rate of resistance variation is also decreased rapidly. On the other hand, if the angle $\Theta$ exceeds 56°, a variation is caused in the field strength distribution within the patterned surface of the MR element pattern 3 and the rate of resistance variation is decreased rapidly.

This means, as will be seen from FIG. 2(b), that greater the inclination of the patterned surface $C_2$ of the MR element assembly 2 with respect to the magnetic force generating surface $C_1$ of the multipole ring magnet 1, greater is the bias field $H\alpha$ in the easy axis direction $\alpha$ with the result that any distortion due to a hysteresis and noise caused by a decrease in the field strength parallel to the patterned surface of the MR element assembly 2 and perpendicular to the longitudinal direction of the MR element pattern 3 is prevented and the peak value of the resistance (hill side resistance) is increased. In addition, one end face of the MR element assembly 2 is removed more from the magnet surface $C_1$ so that the magnetic field applied to the MR element assembly 2 is in general reduced and the resistance variation characteristic of the MR element assembly 2 is changed. As a result, the resistance variation $\Delta R$ attains at a certain point its peak from which it is gradually decreased and it is decreased rapidly when the magnetic field decreases below a certain value. This fact is shown experimentally in FIG. 4.

Thus, while satisfactory effects can be expected if the relative angle $\Theta$ is in the range of 1° to 56°, the relative angle $\Theta$ should preferably be selected between 1° and 46° in consideration of a desire to obtain a rate of resistance variation which is more than two times the conventional one and the stability of detection outputs.

Figure 5:
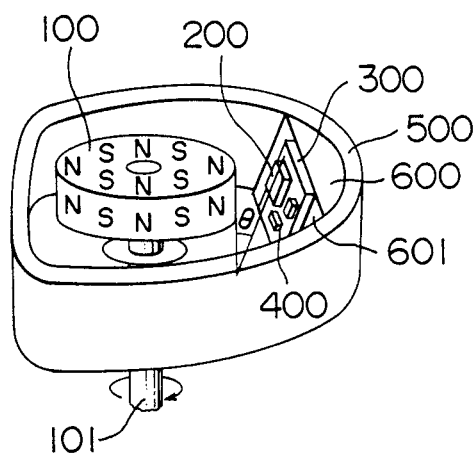
FIG. 5 is a perspective view showing an example of a practical apparatus incorporating the invention.

FIG. 5 shows an example of a practical apparatus incorporating the schematic construction shown in FIGS. 2(a) to 2(c). In the Figure, numeral 100 designates a multipole ring magnet and a driving force is transmitted through a shaft 101 to the rotary shaft of the magnet 100 to bring it into rotary movement. Numeral 200 designates an MR element assembly formed on a printed-circuit board 300. Numeral 400 designates circuit elements formed on the printed-circuit board 300 to detect and process an output of the MR element assembly 200. Numeral 500 designates a case of a plastic material and a plastic mount 600 is integrally molded with the case 500 on the inner side thereof. Moreover, in order that the angel $\Theta$ made by the outer peripheral side surface of the multipole ring magnet 100 and the patterned surface of the MR element assembly 200 may attain a predetermined angle $\Theta$, a mounting surface 601 of the mount 600 is inclined at this predetermined angle $\Theta$.

As a result, the desired angle setting can be made automatically and accurately by simply forming the MR element pattern parallel to the direction of the inclination and mounting the board 300 on the mounting surface 601.

Figure 6:
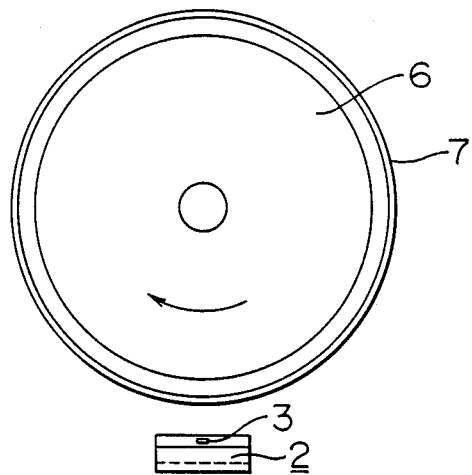
FIGS. 6 and 7 show another practical apparatus incorporating the invention.
Figure 7:
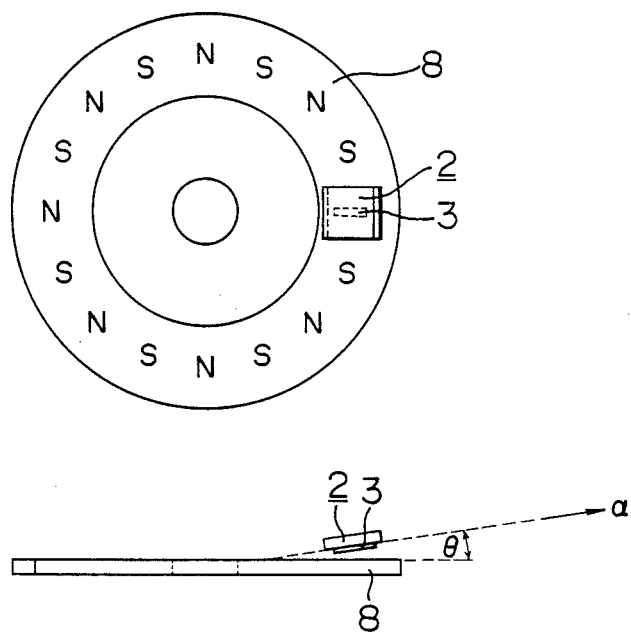

While, in the previously described embodiment, the MR element assembly 2 is combined with the multipole ring magnet 1 for rotational position detecting purposes, the present invention is also applicable to other constructions in which the MR element assembly 2 is combined with a magnetic drum to detect the magnetic signals recorded on the drum as shown in FIG. 6 or the MR element assembly 2 is combined with a magnetic disk to detect the magnetic signals recorded on the disk as shown in FIG. 7. In other words, in these cases no biasing magnet is used and the magnetic field of the magnetic drum or the magnetic disk is utilized to apply the required bias field in the longitudinal direction (the direction of the easy axis of magnetization) of the MR element assembly. In FIG. 6, the MR element assembly 2 is arranged as described in connection with FIGS. 2(a) to 2(c) for the purpose of detecting the magnetic signals recorded on a magnetic layer 7 formed on the outer peripheral surface of the magnetic drum 6. On the other hand, in FIG. 7 the magnetic disk 8 and the MR element assembly 2 are arranged opposite to each other to make the desired angle $\Theta$.

From the foregoing description it will be seen that in accordance with the invention, by virtue of the fact that a magnetic recording medium and the patterned surface of an MR element assembly are arranged so as to make a predetermined angle, the desired magnetic field can be applied in the direction of the easy axis of magnetization of the MR element assembly without using any biasing magnet and this has the effect of reducing instability of detection outputs to prevent any shift in position of the output peak values and reducing variations of the detection outputs thereby improving the rate of resistance variation.

We claim:
1. A position detecting apparatus comprising:
   a magnetoresistive element assembly including an insulating base and a ferromagnetic thin film formed in a narrow strip pattern on said base; and
   a multipole ring magnet for applying a desired magnetic field to said magnetoresistive element assembly,
   said magnetoresistive element assembly and said multipole ring magnet being arranged in a manner such that a plane of a surface of said magnetoresistive element assembly formed with said pattern and a plane of a magnetic force generating surface of said ring magnet are in facing, opposing relation with a predetermined gap therebetween and so as to define an angle of between about 1° and about 56° relative to one another such that a pattern longitudinal direction of said patterned surface and said magnetic force generating surface are disposed at an angle of between about 1° and about 56° whereby, detection output variations due to Barkhausen noise and hysteresis characteristics of said thin film are obviated.

2. An apparatus according to claim 1, wherein said ring magnet is adapted for rotation whereby the strength of a magnetic field applied to said magnetoresistive element assembly is varied in accordance with a rotational position of said ring magnet.

3. A position detecting apparatus comprising:
a sensor base portion including a ferromagnetic magnetoresistive element having a longitudinal pattern defining surface; and
a mulipole magnet base portion having a magnetic force generating surface,
said sensor base portion and said multipole magnetic base portion being spaced apart a predetermined distance, said sensor base portion and said multipole magnet base portion being arranged in such a manner that a magnetic field strength of said magnet base portion adjacent to said sensor base portion changes in response to a change in the relative position of said magnet base portion at said sensor base portion, a plane of said pattern surface and a plane of said magnetic force generating surface being disposed in facing, opposing relation at an angle relative to one another of between about 1° and about 56°
whereby, detection-output variations due to Barkhausen, Noise and Hysteresis characteristics of said ferromagnetic magnetoresistive element are obviated.

4. An apparatus as in claim 3, wherein said angle is between about 1° and about 45°.

5. A position detecting apparatus comprising:
a sensor base portion including a ferromagnetic magnetoresistive element having a longitudinal pattern defining surface; and
a multipole magnet base portion having a magnetic force generating surface, said magnet base portion including a rotatable body member including a multipole ring magnet with alternating north and south poles, and further including means for changing an electrical resistance value of said sensor base portion in response to respective positions of the north and south poles resulting from a rotation of said rotatable body member,
said sensor base portion and said multipole magnetic base portion being spaced apart a predetermined distance, said sensor base portion and said multipole magnet base portion being arranged in such a manner that a magnetic field strength of said magnet base portion adjacent to said sensor base portion changes in response to a change in the relative position of said magnet base portion at said sensor base portion, a plane of said pattern surface and a plane of said magnetic force generating surface being disposed in facing, opposing relation at an angle relative to one another of between about 1° and about 56°
whereby, detection-output variations due to Barkhausen, Noise and Hysteresis characteristics of said ferromagnetic magnetoresistive element are obviated.

6. A position detecting apparatus comprising:
a housing;
a rotatable body mounted in said housing, said rotatable body including a multipole ring magnet having a magnetic field generating surface;
a mounting portion disposed in said housing and having a mounting surface, a plane of said mounting surface being disposed at an angle of about 1° to about 56° relative to a plane of said magnetic field generating surface of said ring magnet which is in facing relation to said plane of said mounting surface;
a substrate having thereon a ferromagnetic magnetoresistive element including a ferromagnetic thin film formed in a stripe pattern along the longitudinal direction thereof;
means for fixing said substrate onto said mounting surface with said longitudinal direction of said magnetoresistive element directed in the longitudinal direction of said mounting surface of mounting portion whereby said magnetic field generating surface of said ring magnet and said pattern longitudinal surface are disposed at an angle of from about 1° to about 56°
whereby, detection output variations due to Barkhausen noise and hysteriesis characteristics of said thin film are obviated.

7. An apparatus as in claim 6, wherein said magnetic field generating surface angle and said patterned longitudinal surface are disposed of from about 1° to about 45°.

* * * * *